United States Patent
Li et al.

(10) Patent No.: US 6,672,372 B1
(45) Date of Patent: Jan. 6, 2004

(54) HYDROGEN STORAGE DEVICE FOR AVOIDING POWDER DISPERSION

(75) Inventors: Yu-Chu Li, Judung Hsinchu (TW); Shih-Ming Lee, Jungli (TW); Jenn-Chen Tang, Judung Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/294,589

(22) Filed: Nov. 15, 2002

(51) Int. Cl.$^7$ .............................................. F28D 15/00
(52) U.S. Cl. ...................... 165/104.12; 165/10; 62/480
(58) Field of Search ............................ 165/107.12, 907, 165/10, 902; 62/480, 46.2

(56) References Cited

U.S. PATENT DOCUMENTS

| | | | | |
|---|---|---|---|---|
| 4,077,788 A | * | 3/1978 | Woollam | 62/46.2 |
| 4,576,640 A | * | 3/1986 | Wootton et al. | 420/83 |
| 4,580,404 A | * | 4/1986 | Pez et al. | 62/55.5 |
| 5,676,202 A | * | 10/1997 | Akashi et al. | 165/104.12 |

* cited by examiner

Primary Examiner—Terrell McKinnon
(74) Attorney, Agent, or Firm—Arent Fox Kintner Plotkin & Kahn, PLLC

(57) ABSTRACT

A hydrogen storage device for avoiding powder dispersion, having a magnetic hydrogen-absorbing material, prevents powder, generated as the hydrogen-absorbing material releases and absorbs hydrogen, from clogging pipelines, a design that can increase the gas flux and work efficiency, thus extending the device lifetime; a magnetic component having a strong magnetic field is further included to keep the magnetic property of the hydrogen-absorbing material, thus the magnetic strength of the hydrogen-absorbing material will not reduce due to the repeated residual stress actions.

6 Claims, 3 Drawing Sheets

HYDROGEN STORAGE DEVICE FOR AVOIDING POWDER DISPERSION

BACKGROUND OF THE INVENTION

1. Field of Invention

The invention relates to a hydrogen storage device. In particular, the invention relates to a hydrogen storage device that is filled with magnetic hydrogen-absorbing material to avoid powder dispersion. Through the mutual attraction of the magnetized hydrogen-absorbing material, the powder dispersion phenomenon can be avoided when the hydrogen-absorbing material is repeatedly released and absorbed.

2. Related Art

There are many known hydrogen storage methods, including those using high-pressure hydrogen storage containers, liquid storage reservoirs, carbon nanotubes and metal hydrides. In order to storage more and purer hydrogen, the industry has started to use the reversible hydrogen absorption property of hydrogen-absorbing materials not only to store a large amount of hydrogen, but also to obtain highly purified hydrogen as the hydrogen-absorbing materials only attract hydrogen gas. Such hydrogen-absorbing materials have been widely used in fuel cells. The hydrogen-absorbing materials can storage huge quantity of hydrogen gas so that the fuel cells can generate more power, providing various industries with much-needed power. Consequently, the hydrogen-absorbing material becomes an indispensable ingredient of fuel cells.

A conventional hydrogen storage device 200, as shown in FIG. 3, contains: a heat exchange reservoir 10, a fluid pipeline 20, a hydrogen duct 30, a plurality of fins 40, a hydrogen-absorbing material 50 and a filter 70, wherein the fluid pipeline 20 has an inlet 21 and an outlet 22 disposed on both sides of the heat exchange reservoir 10. The hydrogen duct 30 is disposed at the upper central position of the heat exchange reservoir 10 for hydrogen to absorb or release heat. The plurality of fins 40 is fixatedly disposed at the fluid pipeline 20 for the fluid pipeline 20 to disperse heat. The hydrogen-absorbing material 50 is filled in the heat exchange reservoir 10 for storage hydrogen. The filter 70 is placed inside the heat exchange reservoir 10 and connected to the end of the hydrogen duct 30 that is positioned in the heat exchange reservoir 10 for filtering powder from hydrogen-absorbing material 50.

When hydrogen is guided through the hydrogen duct 30 into the heat exchange reservoir 10, the hydrogen-absorbing material 50, by having the property of being able to reversely absorb and release hydrogen, can store a huge amount of hydrogen. When the hydrogen-absorbing material 50 releases hydrogen, the hydrogen gas escapes through the hydrogen duct 30. As the hydrogen-absorbing material 50 repeatedly releases and absorbs hydrogen, the phenomenon of powderization will occur, with powder generated therefrom being taken away by the hydrogen flow due to pressure differences. In this case, the filter 70 is utilized for filtering such powder of the hydrogen-absorbing material 50, allowing only hydrogen to be ducted out of the hydrogen duct 30.

Powder generated by the continuous release and absorption of the hydrogen-absorbing material 50 eventually results in the reduction of the gas flux and work efficiency of the conventional hydrogen storage device 200. Although a porous filter 70 is provided to stop such powder, the cost of the hydrogen storage device nevertheless goes up. Moreover, once the filter 70 absorbs the hydrogen-absorbing material powders to a certain extent or saturates, one needs to replace it with a new one. Thus, the maintenance cost also increases.

SUMMARY OF THE INVENTION

The primary object of the invention is to provide a hydrogen storage device that prevents powder, being generated when the hydrogen-absorbing material releases and absorbs hydrogen, from clogging the pipeline, thereby increases the overall work efficiency.

To achieve the above object, the disclosed hydrogen storage device comprises a heat exchange reservoir, a fluid pipeline, a hydrogen duct, a plurality of fins, and a magnetized hydrogen-absorbing material. The fluid pipeline is deflectively installed in the heat exchange reservoir with an inlet and an outlet formed on the top of the heat exchange reservoir. The hydrogen duct is disposed on one side of the heat exchange reservoir for guiding hydrogen flow. The fins are fixatedly installed along the fluid pipeline for dispersing heat. The hydrogen-absorbing material is magnetized and utilized to fill inside the heat exchange reservoir.

Another object of the invention is to provide a hydrogen-absorbing material, which is magnetic after being magnetized.

A further object of the invention is to provide a hydrogen-absorbing material, which is magnetized by a magnetic component.

The hydrogen-absorbing materials include nickel alloys and titanium alloys.

The heat exchange reservoir is further installed with a magnetic component that provides with a strong magnetic field to keep the hydrogen-absorbing material magnetized. Such design solves the problem of magnetization strength reduction due to repeated residual stress actions.

The height of the magnetic component is larger than that of the filled hydrogen-absorbing material.

The magnetic component is a permanent magnet or electromagnetic coil.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE PREFERRED EMBODIMENTS

Figure 1:
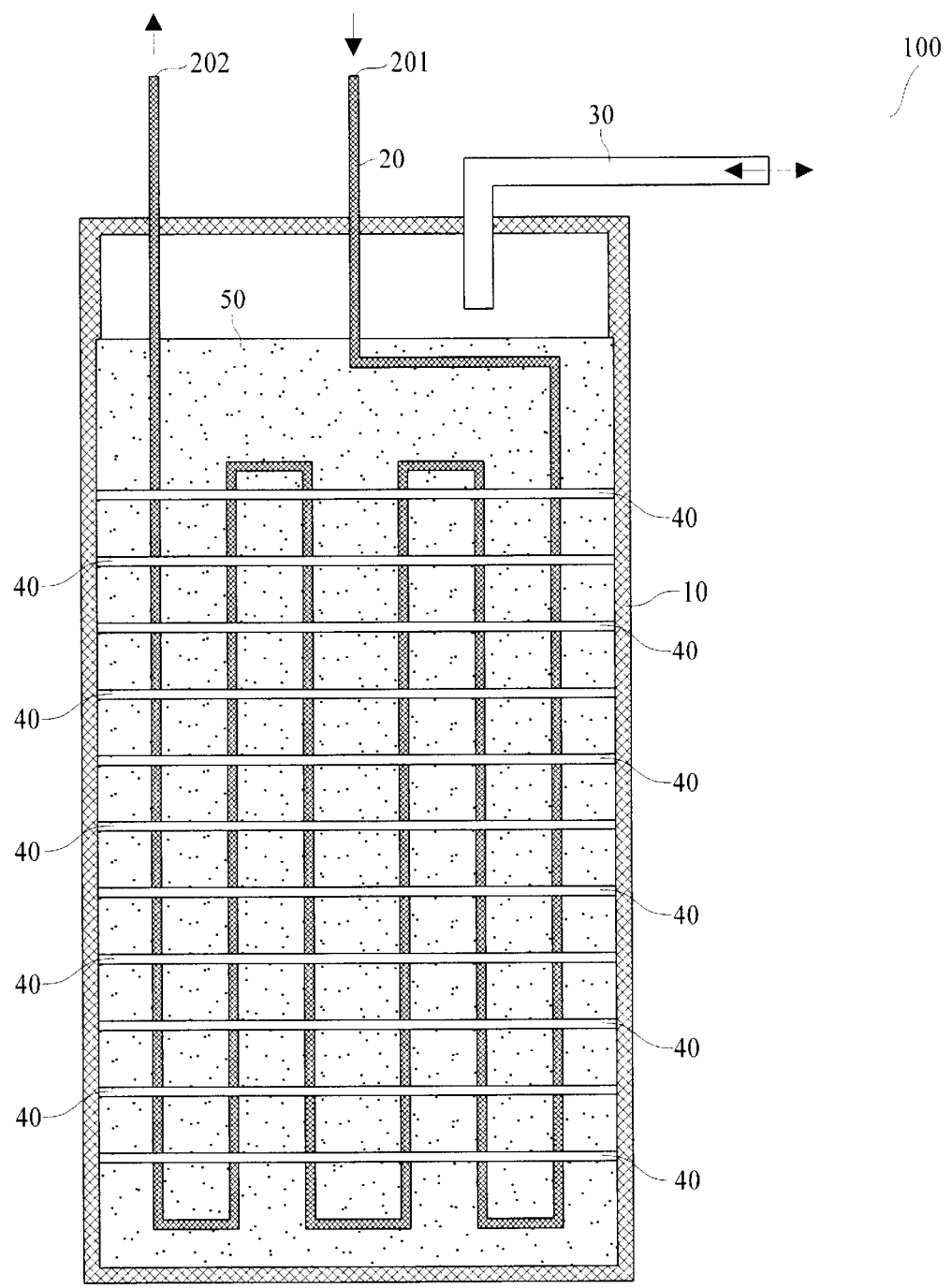
FIG. 1 shows a structure of the disclosed hydrogen storage device for avoiding powder dispersion.

As shown in FIG. 1, the disclosed hydrogen storage device 100 for avoiding powder dispersion comprises a heat exchange reservoir 10, a fluid pipeline 20, a hydrogen duct 30, a plurality of fins 40, and a hydrogen-absorbing material 50. The fluid pipeline 20 is an S-shaped pipe deflectively disposed inside the heat exchange reservoir 10 with an inlet 201 and an outlet 202 formed on the top of the heat exchange reservoir 1 0. The hydrogen duct 30 is installed on the upper side of the heat exchange reservoir 10 for hydrogen to release and absorb heat. The fins 40 are fixatedly installed along the fluid pipeline 20 for heat dispersion. The hydrogen-absorbing material 50 is filled inside the heat exchange reservoir 10 for storing hydrogen. The hydrogen-absorbing material 50 is comprised of two or more magnetized elements that can be formed by nickel and titanium alloys, wherein the nickel alloys include LaNi alloys, and the titanium alloys include TiFe alloys and TiMn alloys.

Please continue referring to FIG. 1. The operation of the storage device 100 shall be further elaborated in detail. When hydrogen is guided through the hydrogen duct 30 into the heat exchange reservoir 10, the hydrogen-absorbing material 50, by having the property of being able to reversely absorb and release hydrogen, can store a huge amount of hydrogen. When the hydrogen-absorbing material 50 absorbs hydrogen, heat is released so that the temperature inside the heat exchange reservoir 10 increases. At this moment, cold water is led into the heat exchange reservoir 10 through the inlet 201 of the fluid pipeline 20 and absorbs heat from the fins 40, thus becoming warm water; afterwards such warm water is led out via the outlet 202 of the fluid pipeline 20, achieving the goal of heat exchange. When releasing hydrogen, the hydrogen-absorbing material 50 releases hydrogen through the outlet 302 of the hydrogen duct 30 and absorbs heat at the same time. The temperature inside the heat exchange reservoir 10 is thus lowered. Warm water is then led into the heat exchange reservoir 10 through the inlet 201 of the fluid pipeline 20 and is turned into cold water that is later led out via the outlet 201 of the fluid pipeline 20. During the process of repeated hydrogen release and absorption, the hydrogen-absorbing material 50 will form powder. However, since the hydrogen-absorbing material 50 in the invention is magnetized, such powder mutually attracts and is not to be brought away by the hydrogen flow, thus the powder dispersion is avoided.

Figure 2:
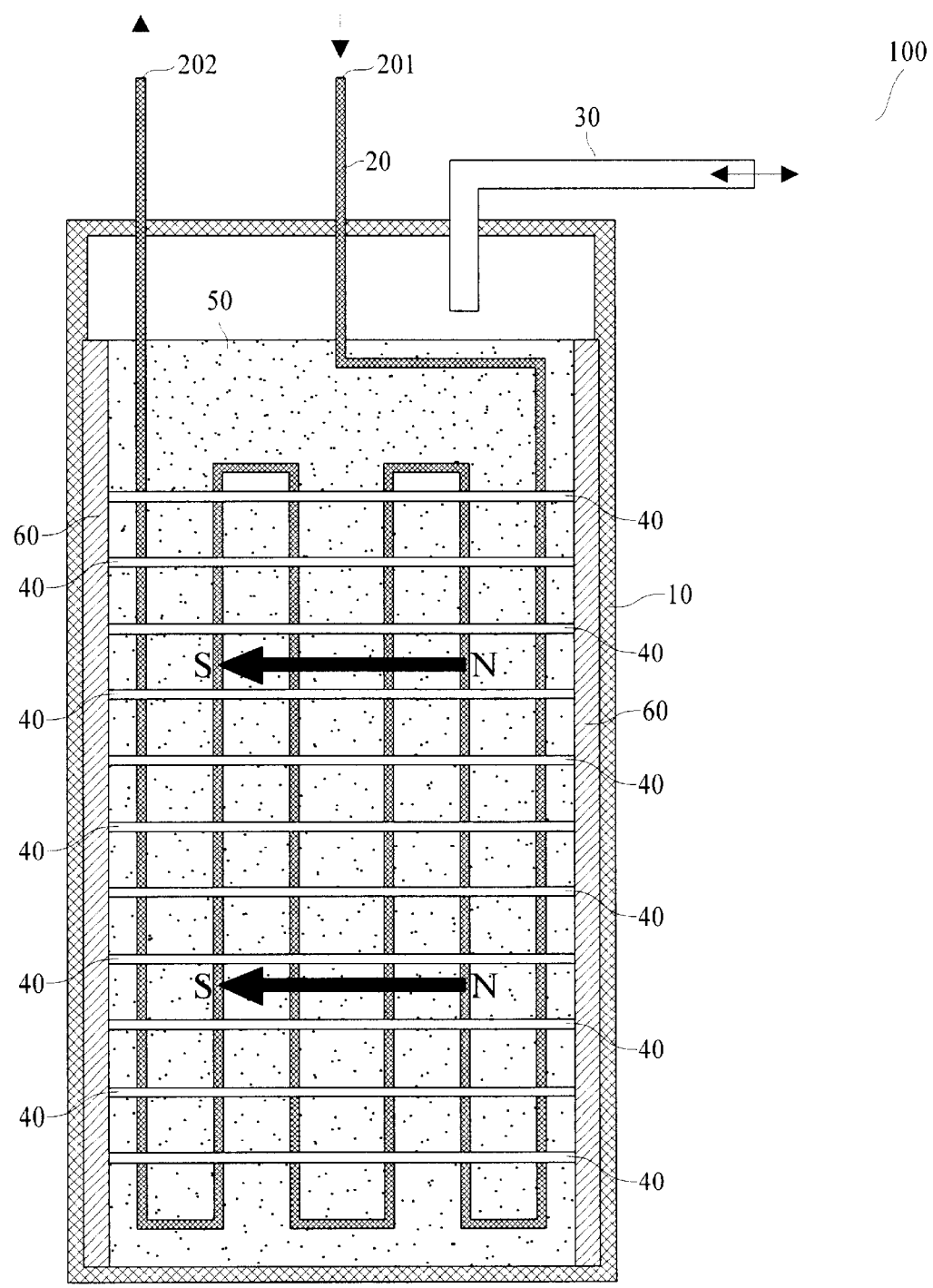
FIG. 2 shows another structure of the disclosed hydrogen storage device for avoiding powder dispersion.
Figure 3:
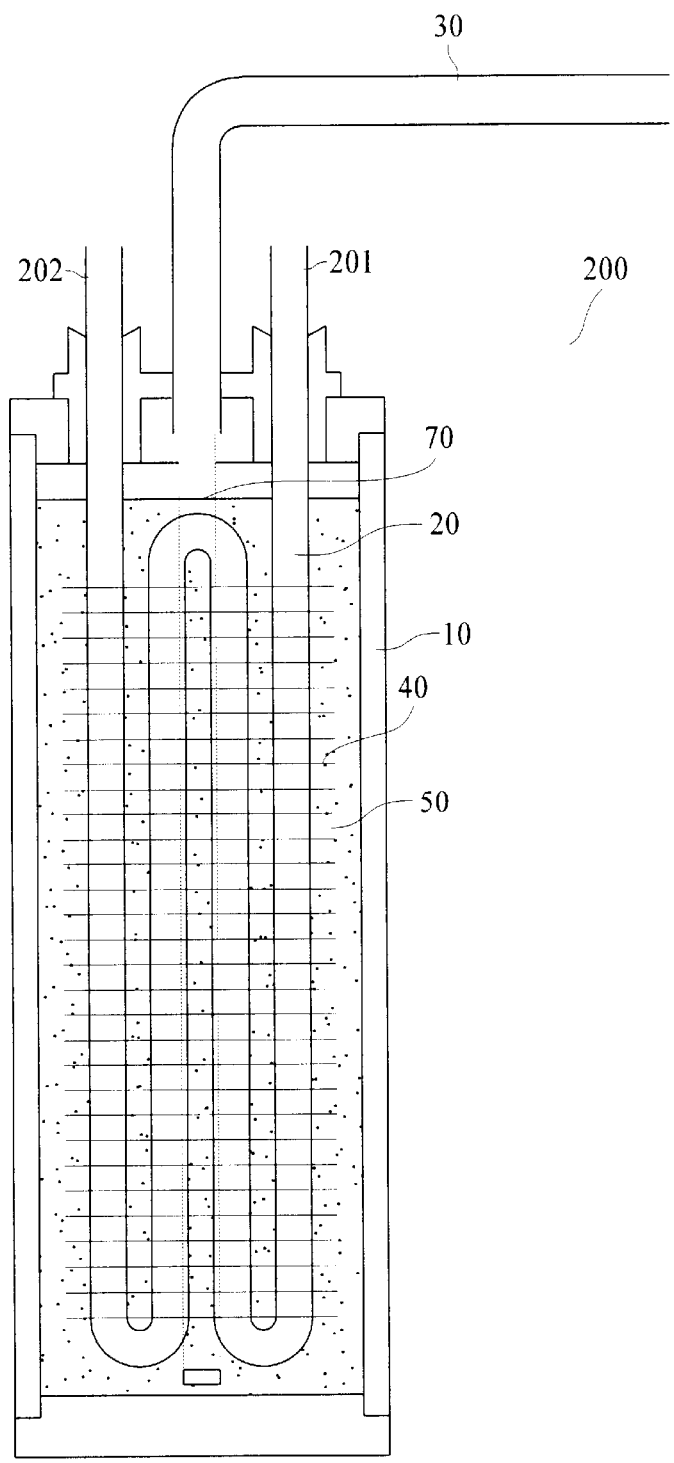
FIG. 3 shows the structure of a conventional hydrogen storage device for avoiding powder dispersion.

The invention is further provided with a magnetic component 60, which will be elaborated with reference to FIG. 2.

In FIG. 2, except for the magnetic component 60, all elements are identical to those in FIG. 1 and thus are not described here again. The magnetic component 60 is installed on both sides inside the heat exchange reservoir 10. The magnetic component 60 provides with a strong magnetic field to keep the hydrogen-absorbing material 50 magnetized. Therefore, the hydrogen-absorbing material 50 does not reduce its magnetization due to the repeated actions of residual stress. This can ensures the ability of the hydrogen-absorbing material 50 to reversely absorb and release hydrogen. The height of the magnetic component 60 is preferably maintained larger than that of the filled hydrogen-absorbing material 50, so that the magnetic strength of all the hydrogen-absorbing material is kept constant. Whether the magnetic component 60 is a permanent magnet or an electromagnetic coil is not limited by the invention.

The hydrogen-absorbing material 50 of the disclosed storage device 100 is not limited only for hydrogen storage. It can also be used in a cryogenic system. Using the phenomena that the hydrogen-absorbing material automatically increases/decreases its temperature when releasing/absorbing hydrogen, one is able to make a cryogenic system without a compressor. Such a design does not only avoid the use of freon that sabotages the ozone layer, but it also does not require a compressor so that the system becomes simplified and has no noise and vibration problems.

After the above detailed description of the invention using preferred embodiments, any person skilled in the art can clearly understand and, without departing from the scope and spirit of the claims hereinafter, can make various modifications and changes. For example, the method of generating a magnetic field to maintain the magnetization of the hydrogen-absorbing material is not limited to the above-mentioned methods that use a magnetic component or an electromagnetic coil. Any method that produces a magnetic field is good as well.

What is claimed is:

1. A hydrogen storage device for avoiding powder dispersion, comprising:

a heat exchange reservoir;

a fluid pipeline deflectively disposed inside the heat exchange reservoir with an inlet and an outlet formed on the top of said heat exchange reservoir;

a hydrogen duct disposed on one side of said heat exchange reservoir for hydrogen to enter and escape;

a plurality of fins fixatedly disposed along said fluid pipeline for dispersing heat; and a hydrogen-absorbing material, which is magnetic and placed in said heat exchange reservoir, wherein said hydrogen-absorbing material is comprised of nickel alloys and titanium alloys.

2. A hydrogen storage device for avoiding powder dispersion, comprising:

a heat exchange reservoir;

a fluid pipeline deflectively disposed inside the heat exchange reservoir with an inlet and an outlet formed on the top of said heat exchange reservoir;

a hydrogen duct disposed on one side of said heat exchange reservoir for hydrogen to enter and escape;

a plurality of fins fixatedly disposed along said fluid pipeline for dispersing heat; and a hydrogen-absorbing material, which is magnetic and placed in said heat exchange reservoir, wherein said heat exchange reservoir is further installed with a magnetic component having a strong magnetic field so as to keep said hydrogen-absorbing material magnetized, and wherein the height of said magnetic component is larger than that of said filled hydrogen-absorbing material.

3. The hydrogen storage device of claim 2, wherein said magnetic component is a permanent magnet.

4. The hydrogen storage device of claim 2, wherein said magnetic component is an electromagnetic coil.

5. A hydrogen-absorbing material utilized in the hydrogen storage device for avoiding powder dispersion, which is magnetized by a magnetic component, wherein said magnetic component is a permanent magnet.

6. A hydrogen-absorbing material utilized in the hydrogen storage device for avoiding powder dispersion, which is magnetized by a magnetic component, wherein said magnetic component is an electromagnetic coil.

* * * * *